(12) United States Patent
Larsson et al.

(10) Patent No.: US 6,848,103 B2
(45) Date of Patent: Jan. 25, 2005

(54) METHOD AND APPARATUS FOR PROCESSING DATA IN A MULTI-PROCESSOR ENVIRONMENT

(75) Inventors: Gunnar Larsson, Tumba (SE); Patrik Wiss, Stockholm (SE); Lars-Göran Petersen, Tumba (SE); Ulf Ekstedt, Saltsjöbaden (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 676 days.

(21) Appl. No.: 09/784,850

(22) Filed: Feb. 16, 2001

(65) Prior Publication Data

US 2003/0018807 A1 Jan. 23, 2003

(51) Int. Cl.[7] .................................................. G06F 9/00
(52) U.S. Cl. .................... 718/106; 718/107; 718/102; 718/100
(58) Field of Search ................................ 718/100–101, 718/102, 106, 107, 103, 104, 105, 108

(56) References Cited

U.S. PATENT DOCUMENTS

| | | | | |
|---|---|---|---|---|
| 4,915,570 A | * | 4/1990 | Rath et al. ................... 414/409 |
| 5,142,665 A | * | 8/1992 | Bigus ........................... 706/44 |
| 5,428,782 A | * | 6/1995 | White ........................... 718/101 |
| 5,797,004 A | * | 8/1998 | Lindholm et al. ............ 718/104 |
| 5,819,089 A | * | 10/1998 | White ........................... 718/106 |
| 5,826,253 A | * | 10/1998 | Bredenberg ................... 707/2 |
| 6,195,676 B1 | * | 2/2001 | Spix et al. ................... 718/107 |

FOREIGN PATENT DOCUMENTS

| | | | | |
|---|---|---|---|---|
| WO | 88 08162 A | * | 10/1988 | ........... G06F/13/36 |
| WO | 98 09213 A | | 3/1998 | |

OTHER PUBLICATIONS

Swedish Application No. 0000868–0, filed Mar. 15, 2000, entitled "Versatile Media Gateway Architecture".

* cited by examiner

*Primary Examiner*—Majid A. Banankhah

(57) ABSTRACT

Method and apparatus for processing data in a multi-processor environment are provided. An application chain is built including at least one application to be performed on the data. The data is received, and program information, e.g., a pointer, is added to the data for identifying a current application in the application chain to be performed on the data. The data is forwarded to an available processor in the multi-processor environment and is processed using the current application identified by the added program information. The processed data is updated with new program information identifying a next application in the application chain to be performed, if any. The processed data is forwarded to an available processor, processed, and updated repeated times until the data is processed by all applications in the application chain.

25 Claims, 7 Drawing Sheets

METHOD AND APPARATUS FOR PROCESSING DATA IN A MULTI-PROCESSOR ENVIRONMENT

BACKGROUND

This invention relates generally to a method and apparatus for processing data in a multi-processor environment. More specifically, this invention relates to a method and apparatus for processing data through a chain of applications in a multi-processor environment, e.g., a multi-processor communication system.

As the demands for telecommunications increase, network architecture is continually being developed to handle various types of communications, e.g., Internet, wireline calls, wireless calls, etc. With the introduction of Internet and multimedia, the traditional telecommunication networks supporting 64 kbps circuit switched voice data are no longer sufficient. Most of the new services are based on packet transport. Even voice services can be packet-based. Today, circuit switched networks are used for real-time services, like voice, and packet switched networks are used for data. Managing and supporting these different types of networks is inefficient and expensive. Thus, there have been attempts to provide a network architecture that can handle real times service and data. There have also been attempts to make this architecture compatible with exiting networks.

An example of a network entity that has recently been developed to handle various types of communication is the Media Gateway (MGW) as described, e.g., in Swedish Application No. 0000868-0, filed Mar. 15, 2000, which is hereby incorporated by reference.

An exemplary network configuration including an MGW is shown in FIG. 1. In this type of system, call control is separated from connection control and the user plane. The MGW 100 handles the connection control and the user plane, and a server, e.g., the Mobile Switching Center (MSC) Server 110, handles the call control. The MGW 100 is a self-contained network node that includes a full set of speech and data resources, collectively referred to as Media Stream Applications (MSAs). The MSAs are individually controlled and separated from the external transmission and addresses (connection endpoints). The MGW 100 provides a switching function to connect different MSAs and external connection endpoints, e.g., a core network 120, an access network 140 and/or a PSTN/Internet 130. MGWs are currently being developed for networks such as the GSM/UMTS network.

Examples of MSAs include a Transcoder (codec), an Echo Canceller (EC), a Tone/DTMF sender/receiver, a Conference Call Device (CCD), an Announcement Machine, and a Data Transmission Interworker (DTI). The Transcoder converts data between different voice coding formats, e.g., between PCM coded and ARM coded voice. The EC suppresses/removes echoes generated in the PSTN. The Tone/DTMF sender/receiver generates and receives tones, e.g., a busy tone or a call in progress tone. The CCD enables multi-party calls. The Announcement Machine generates standard messages for announcement to the subscriber, e.g., an error message indicating a dialed number is not in use. The DTI is used as a modem pool for circuit switched data.

More than one MSA is often needed for a call. For example, a Transcoder (codec) and an EC are both needed for many calls, e.g., for a mobile to PSTN/ISDN call. Thus, MSAs are typically linked in a chain, or so-called call chain, such as that depicted in FIGS. 2A and 2B. In FIG. 2A, a physical call chain is shown. In FIG. 2B, a logical call chain is shown. A link can either be an MSA, as explained above, or an Exchange Terminal (ET).

An ET is a board used to interface with the external network. The ET terminates the physical layer used in the network and interfaces the space switch used in the node. The space switch performs the physical sending of cells belonging to different connections to different outgoing ETs.

The partitioning of functionality between the ETs and the space switch differs in different implementations. In the simplest case, e.g., for an ATM connection through the node, the ATM cell header indicates which ET a cell should be sent to. The cell is then switched in the space switch to the outgoing ET, which is connected to the network. The cell is switched based on the Virtual Path Identifier (VPI) and Virtual Channel Identifier (VCI), which the ET uses to refer to a connection table that indicates to which outgoing ET the cell should be sent.

Switching includes both space switching and logical switching. Logical switching is performed when the VPI/VCI value is changed, e.g., by adding information to the cell. This information is used by the space switch to route to the cell to the correct ET. The VPI/VCI values may be changed in either or both an incoming or an outgoing ET.

When the MGW is used to perform an MSA, an MGW internal connection is used to connect the ET to the MSB.

In FIGS. 2A and 2B, the call chain includes four links: ET 1, Codec, EC and ET 2. The MSAs, Codec, and EC may be implemented in a Digital Signal Processor (DSP). During a call, MSAs can also be linked in and linked out of the call chain.

MSAs are executed in processors, a number of processors typically being included on a board. A plurality of boards are included in a magazine. A number of magazines are included in a node. In most existing implementations of MSAs, there are dedicated boards for each MSA, or at least for many MSAs. This is apparent from FIG. 2A. This means that each node has to be equipped for the maximum usage of each MSA. The usage of MSAs can vary over time, both long term and short term.

It is possible today to implement a Generic Processing Board (GPB), which can handle several different MSAs on the same physical board. The board could, for example, be implemented with a number of DSPs. A GPB used for executing MSAs is referred to as a Media Stream Board (MSB). GPBs are typically configured for a specific MSA at start up, in which case the node has to be equipped for maximum usage of each MSA.

It would be desirable to be able to use the total processing capacity from all MSBs in the node and throughout the network as a pool for the MSAs. To accomplish this, it would be necessary to allow the GPBs to be dynamically configured with the needed MSA code. The entire processing capacity of the network could then be handled as a resource for any given MSA.

In order to be able to fully utilize the network's processing resources, and at the same time not exceed the available capacity, both MSA code allocation to the various processors of the network and the number of instances of each MSA in the processing resource should depend on the actual need. To fully utilize the total processing capacity, a method for allocating MSAs and instances of MSAs to the different boards/processors is needed.

SUMMARY

It is therefore an object of the present invention to provide a technique for processing data by allocating MSAs and instances of MSAs to different boards and/or processors in a multi-processor environment as the MSAs are needed.

According to an exemplary embodiment of the present invention, this and other objects are met by a method and apparatus for processing data in a multi-processor environment, e.g., a communication system. An application chain is built including at least one application to be performed on the data. The data is received, and program information is added to the data for identifying a current application in the application chain to be performed on the data. The data is forwarded to an available processor in the multi-processor environment and is processed using the current application identified by the added program information. The processed data is updated with new program information identifying a next application in the application chain to be performed, if any. The processed data is forwarded to an available processor, processed, and updated repeated times until the data is processed by all applications in the application chain.

According to other exemplary embodiments, the data is received in the form of packets. Each packet includes both a header for storing the added and updated program information, and a payload for storing the received and processed data. Application code may forwarded for the current application from at least one code server operating in the multi-processor environment to the available processor for use in processing the data, if the code for the current application is not already installed on the available processor. The code for the current application may be removed from the available processor after the data has been processed. Additional data needed for performing the application may be retrieved from an address location determined using the program information. After processing of the data by the current application is completed, at least one of the processed data, the program information, and an output state of the available processor may be stored at an address location determined using the program information.

According to yet another exemplary embodiment, the application chain is built by forming a link for each of the at least one applications in the chain. The link includes information pertaining to a processor pool address identifying where in the multi-processor environment the available processor is to be located. The links also include an application identifier for the current application the link represents. Each link in the chain has a first pointer identifying one of a previous link in the application chain and an entry point for the data, and a second pointer identifying one of a next link in the application and an exit point for the data. A priority associated with the current application, and a link identifier indicating whether a next link in the application chain includes an application identifier are also included. The processor pool address specifies a plurality of processors located within at least one of a communication network, a network node, a magazine of a network node, a media stream board, and a subset of a plurality of processors located on a media stream board.

According to another exemplary embodiment, at least some of the link information may be stored in a connection table having a record for each link in the application chain. The records are indexed by the corresponding first pointer of each link. The records store information, including the application identifier for the application the corresponding link represents, data information for the corresponding link, the priority associated with the application, the link identifier indicating whether the next link in the application chain includes an application identifier, and the corresponding second pointer.

According to yet another exemplary embodiment, the data information includes a data entry field specifying a number of data entries to be used by the current application. Both an address field, indicating a starting address, and a length field, indicating a length in memory, is included for a respective entry. A read bit indicating whether data should be read from the address of a respective entry and used by the current application when processing the data is included. Also, the data information includes a write bit indicating whether data should be written to the address of a respective entry after execution of the current application.

According to other exemplary embodiments, certain applications may be preinstalled on a plurality of processors operating in the multi-processor environment. Also, all applications of a respective application chain may be executed on a respective processor of the multi-processor environment. Moreover, the multi-processor environment may be a communication system, and the applications may be media stream applications.

BRIEF DESCRIPTION OF THE DRAWINGS

The features, objects, and advantages of the invention will become apparent by reading this description in conjunction with the accompanying drawings, in which like reference numerals refer to like elements and in which.

DETAILED DESCRIPTION

For illustrative purposes, the following description is directed to the allocation of resources for MSAs in a communication system. However, it will be appreciated that the invention is not limited to such applications but may be used for allocating any application in any multi-processor system.

Figure 1:
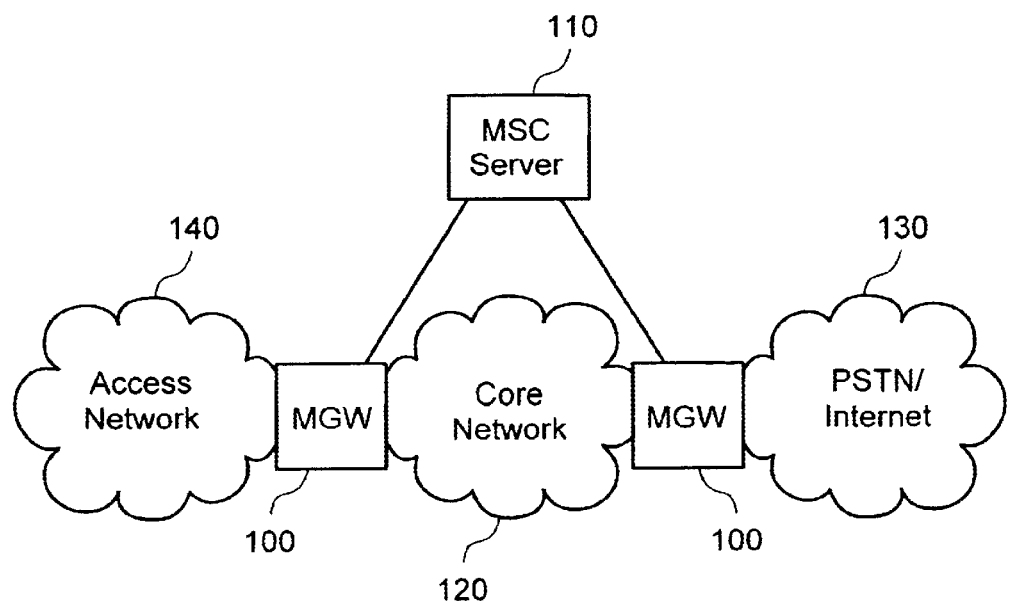
FIG. 1 illustrates a network architecture including an MGW.
Figure 2A:
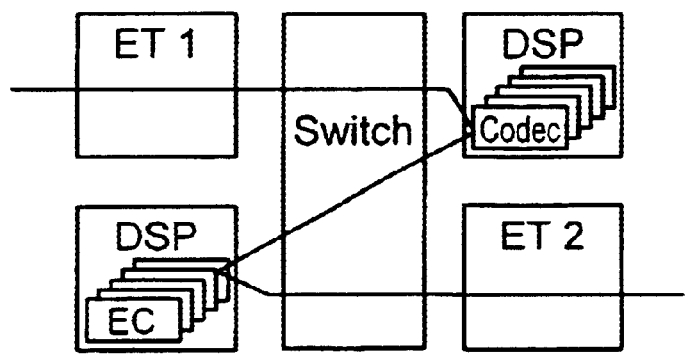
FIG. 2A illustrates a physical view of a typical call chain.
Figure 2B:
FIG. 2B illustrates a logical view of a typical call chain.
Figure 3:
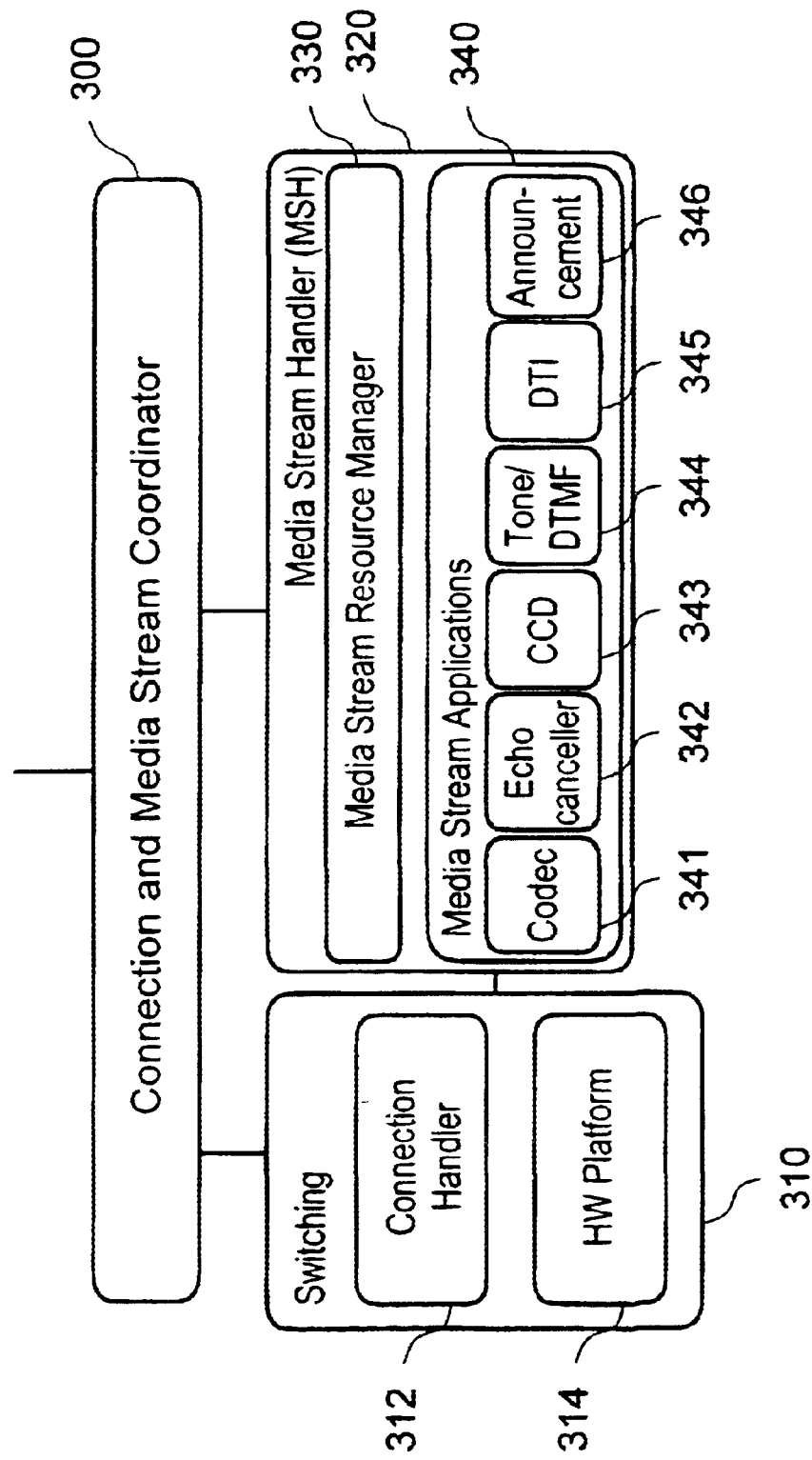
FIG. 3 illustrates an exemplary MGW system architecture.

FIG. 3 illustrates a system structure for node implementation, e.g., a Media Gateway (MGW) in a GSM/UMTS communication system. According to an exemplary embodiment, the system includes three main parts: a Connection and Media Stream Coordinator (CMSC) 300, a Switching Unit 310, and a Media Stream Handler (MSH) 320. The CMSC 300 receives commands for setting up external node connections, e.g., from an MSC Server 110, and for connecting MSAs to the external connections. The CMSC 300 also orders the set up of internal node connections to the MSAs. The Switching Unit 310 includes a Connection Handler 312 that performs the external and internal node connection set up and a Hardware (HW) Platform 314 that contains the hardware and the low level software (Firmware). The user plane is handled in the HW Platform 314, i.e., the physical connections are set up, and the MSAs are executed on the user plane packets in the HW Platform 314. The MSH 320 includes a Media Stream Resource Manager (MSRM) 330 and allocates and connects the MSAs, e.g., Codec 341, Echo Canceller 342, CCD 343, Tone/DTMF 344, DTI 345, and announcement 346, to the node internal connections.

According to an exemplary embodiment, all processors in a network, node, or board are handled as a resource pool. Data is exchanged in the form of packets that are forwarded to available processors within the resource pool as they arrive. The data is then processed by any number of MSAs installed and executing on the respective processors in the pool. This is made possible by including information regarding the identity of the MSA code to be executed in the packet header. The processors use this information to retrieve the various MSAs needed to process the packet data. Thus, no specific processor is assigned for handling a specific MSA or instance of an MSA for a specific call. No specific processor is pre-allocated to the call at all, allowing any processor in the resource pool to be used for any given arriving packet.

To provide an efficient usage of the total processing resources available in the network, the resource pools may be established in priority order according to a priority list. The highest priority may be assigned to the processors resident on a same processing board, i.e., a Media Stream Board (MSB). The next highest priority may be assigned to the processors of all MSBs in the same magazine. A next highest priority may be assigned to the processors on all MSBs in the same node, and so on. The principle of establishing resource pools for the allocation of MSAs in accordance with a priority list is described, e.g., in International Patent Application No. PCT/SE00/01441.

In addition, the priority list for a node may be set up based on what resources are considered bottlenecks for that node. For example, processing capacity for executing software and switch capacity may be the bottlenecks. To save resources, it is important to select the same board for all MSAs for a connection. The software execution is then minimized, since no switch internal connected is needed between the MSAs. User plane switch capacity is also saved, since the packet is not sent out in the switch between two MSAs. For limited bandwidth between magazines, it is important to select boards, for MSAs and ETs, in the same magazine.

In the interest of simplicity, the following description is directed to a configuration wherein all of the processors on a respective MSB are being handled as a resource pool. The MSRM 330 allocates a specific MSB for the processing of arriving packets and the subsequent execution of a MSA in the call chain for the packet, depending on the load characteristics for that MSB.

Figure 4A:
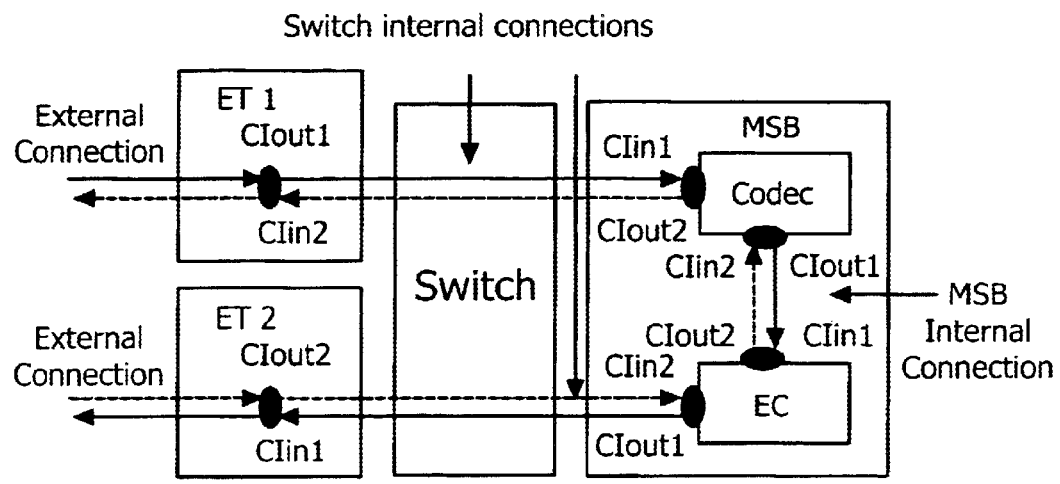
FIG. 4A illustrates a physical view of a call chain according to an exemplary embodiment.
Figure 4B:
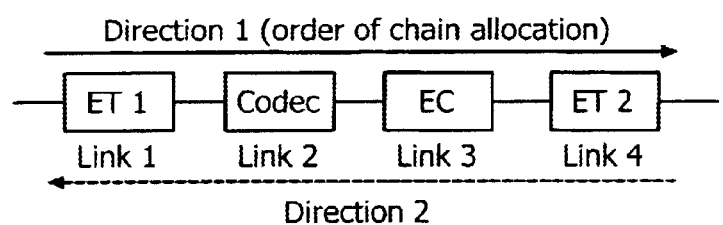
FIG. 4B illustrates a logical view of a call chain according to an exemplary embodiment.

FIGS. 4A and 4B illustrate exemplary call chains. FIG. 4A illustrates a physical view of how a call chain is set up in the HW platform. FIG. 4B illustrates a logical view of the links in a call chain in the CMSC 300.

As can be seen from FIGS. 4A and 4B, a call chain is bidirectional. In this description, the direction in which the chain is set up is referred to as direction 1, and the other direction is referred to as direction 2. The internal switch and internal MSB connections have one Connection Identifier (CI) for a first direction, which may be referred to as CI 1, and another CI for a second direction, which may be referred to as CI 2. These Connection Identifiers are stored in both endpoints of the connection. The identifiers in the endpoints may be referred to as an Incoming Connection Identifier (CIin) and an Outgoing Connection Identifier (CIout). For the same connection, CIout1=CIin1, and CIin2=CIout2.

The two directions can be handled independently of each other for most MSAs. One exception is the Echo Canceling MSA, which requires feedback between the two directions.

In this example, both directions of all MSAs are allocated to the same MSB to simplify the description. This is, however, only necessary for an EC MSA.

Figure 5:
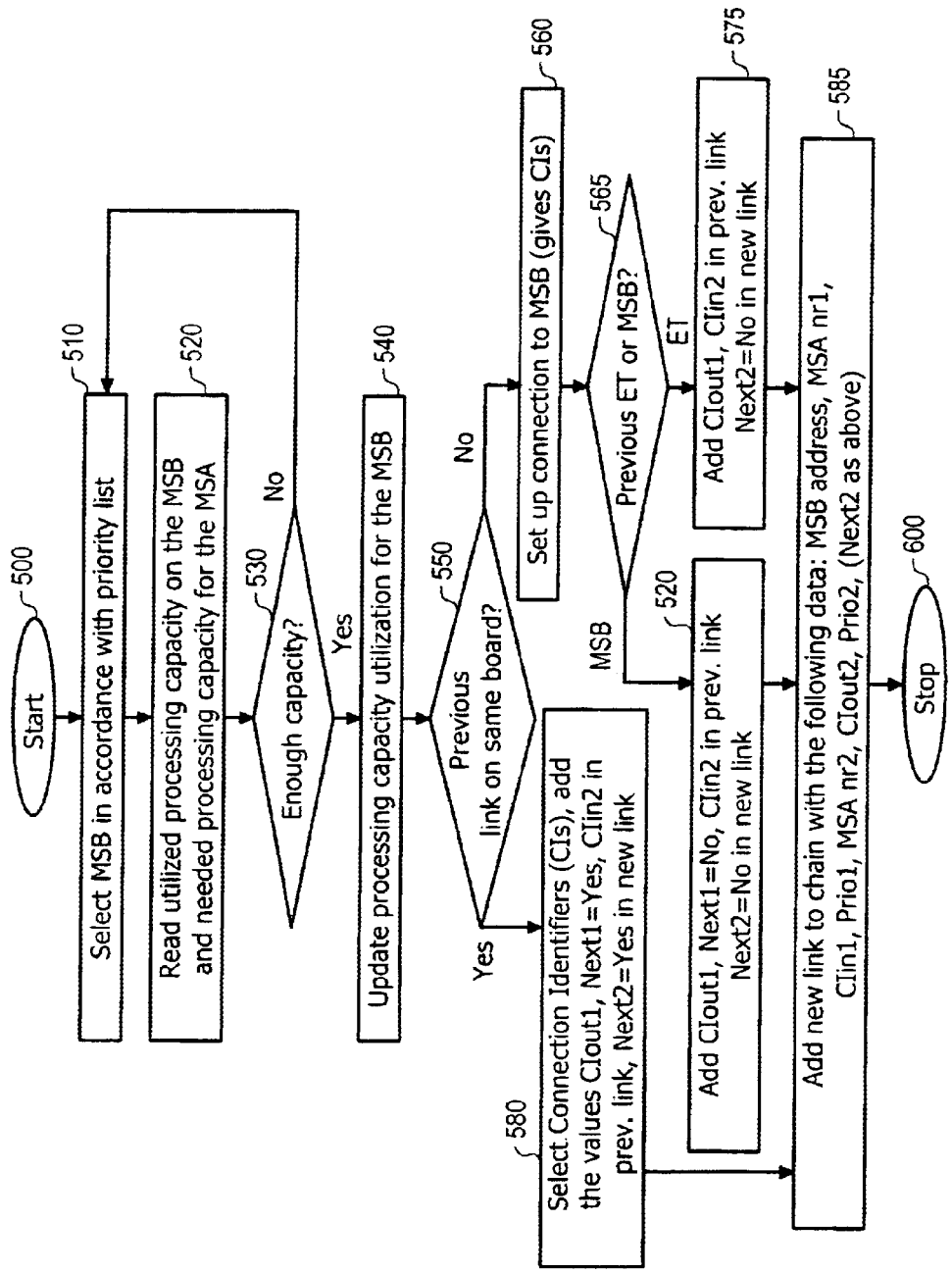
FIG. 5 depicts a flow chart for allocating resources for an MSA.
Figure 6:
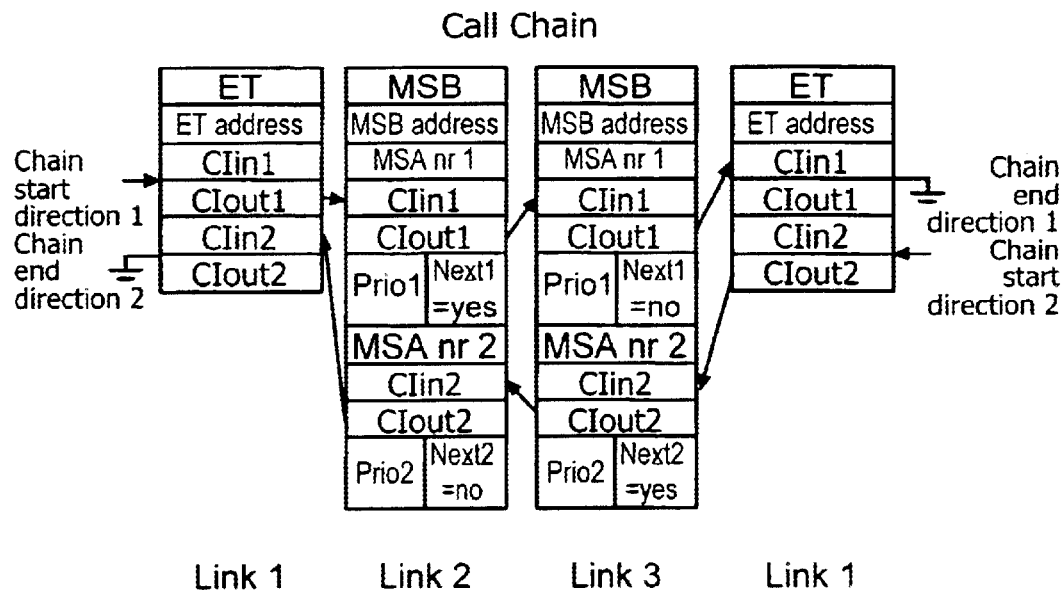
FIG. 6 illustrates exemplary data structures in a CMSC.

FIG. 5 depicts a flow chart of how resources are allocated to an MSA according to an exemplary embodiment. An example of a call chain built using the process of FIG. 5 is shown in FIG. 6.

Allocation of resources for Exchange Terminals (ET) is not shown. However, it will be appreciated that ETs may, for example, be allocated in the same magazine as the MSAs to save bandwidth between magazine.

Referring to FIG. 5, the process of resource allocation starts at step 500. The MSRM 330 has stored information about the processing capacity of each MSB, as well as information about the amount of processing capacity that is needed for executing each MSA. At step 510, an MSB is selected according to the priority list that is stored, e.g., in the MSRM 330. At step 520, the processing capacity of the MSB and the needed processing capacity for the MSA are determined from, e.g., information stored in the MSRM 330. At step 530, the MSRM 330 determines if the MSB has enough processing resources available to handle the new MSA instance. If not, the process returns to step 510. If there is enough processing capacity, then the needed amount of processing capacity is reserved, and the processing capacity utilization is updated for the MSB at step 540.

At step 550, a determination is made whether the previous link in the call chain is on the same board. If the previous link is allocated to another board (ET or MSB), then at step 560, a switch internal connection is set up by the Connection Handler 312 between the board (ET or MSB) that the previous link is allocated to and the newly reserved MSB. The Connection Handler 312 checks to determine whether the switch has resources for the connection, and if it does, data is sent to the two boards between which the connection is set up. That data includes selected incoming and outgoing connection identifiers and information indicating whether additional MSAs are to be executed for the call chain. If, on the other hand, a next MSA is to be executed on the same board as the MSA identified in the previous link of the call chain, a board internal connection is setup between the MSAs beginning at step 580.

After a switch internal connection has been set up between the board (ET or MSB) for the previous link and the newly reserved MSB, a determination is made at step 565 whether the previous link in the call chain is allocated to an ET or to a MSB. If the previous link os allocated to a MSB, then an outgoing connection identifier (CIout1) for a first direction in the call chain, an incoming connection Identifier (CIin2) for a second direction in the call chain, and a link identifier Next1=No (meaning that no more MSAs are to be executed in the first direction of the call chain on the MSB identified in the previous link) are added to the previous link at step 570. Also, a second link identifier Next2 is set equal to "No" at step 570. If, at step 565, it is determined that the previous link in the call chain defines a connection to an ET, then again the outgoing and incoming connection identifiers (CIout1 and CIin2) are added to the previous link in the call chain at step 575. However, unlike at step 570, a link identifier Next1 is not added to the previous link at step 575, because the previous link in the call chain is for an ET, not a MSB.

Whether the previous link in the call chain defines a connection to an ET or a connection to a MSB, a new link is added to the call chain at step 585 having the following information: a MSB address identifying the location of the new MSB in the network, information identifying the MSA to execute for direction 1 (MSAnr1), an incoming connection identifier for direction 1 (CIin1), a priority for direction 1 (Prio1), information identifying the MSA to execute for direction 2 (MSAnr2), an outgoing connection Identifier for direction 2 (CIout2), a priority for direction 2 (Prio2), and the value of Next2 (ie. "No") assigned in either step 570 or in step 575.

If, at step 550, it is determined that a previous link in the call chain identifies the same MSB that a next MSA in the call chain is to be executed on, then a new link is set up in the call chain establishing an internal connection in the common MSB. Before establishing the new link, however, a previous link in the call chain, e.g., Link 2 of FIG. 6, is updated at step 580 with an outgoing connection identifier for direction 1 (CIout1), an incoming connection identifier for direction 2 (CIin2), and a link identifier Next1=Yes, indicating that the next MSA to be executed in the first direction of the call chain is to be executed on the same MSB.

The new link, e.g., Link 3 of FIG. 6, is then added to the call chain at step 585 with information comprising: the current MSB address, information identifying the MSA to execute for direction 1 (MSAnr1), and incoming connection identifier for direction 1 (CIin1), a priority for direction 1 (Prio1), information identifying the MSA to execute for direction 2 (MSAnr2), an outgoing connection identifier for direction 2 (CIout2), a priority for direction 2 (Prio2), and in this instance, a link identifier Next2=Yes, indicating that a next link in the call chain in the second direction calls for the execution of an MSA on this MSB.

The call chain is completed with an ET link, e.g., Link 4 of FIG. 6, defining an internal switch connection between the previous link and the ET. If the previous link is an MSB, then the previous link is updated with an outgoing connection identifier for direction 1 (CIout1), Next1=No (meaning that no more MSAs are to be executed for the call chain on this MSB in direction 1) and an incoming connection identifier 2 for direction (CIin2). When the call chain is completed, the information included in the call chain is sent out to the HW platform 314, and is used by the platform to manage the processing of data packets.

The processing of the packets within an MSB will now be described in conjunction with the exemplary embodiments shown in FIGS. 7–9. It will be understood that the data need not be depicted with an indication of direction (1 or 2 as described above) at the board level, since from the MSB point of view, the directions are handled as separate one-way connections.

Figure 7:
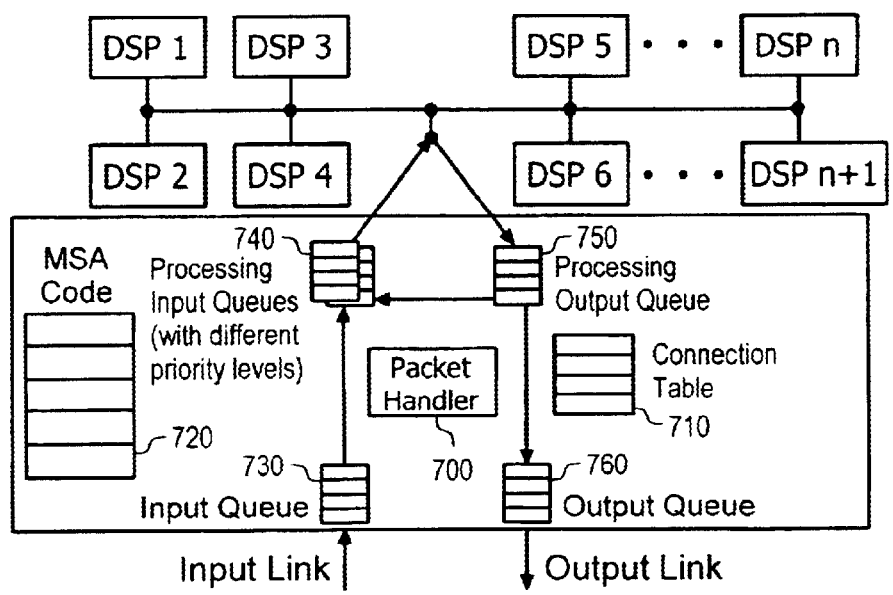
FIG. 7 illustrates an exemplary implementation of an MSB.

FIG. 7 illustrates an exemplary portion of an MSB for handling the packets. The MSB and associated hardware may be included in the Switching Unit 310 shown in FIG. 3. The information stored in each MSA link of the call chain is sent to the Packet Handler (PH) 700 of the MSBs. The PH 700 creates a Connection Table 710 (see FIG. 8) having records corresponding to the links of the call chain. Data is not sent to the MSBs until the call chain is completed and the corresponding Connection Table 710 has been set up. In some cases, the call chain may be completed with an MSA. This may occur when an Announcement Machine is used. In such cases, the data may be sent to the MSBs as soon as the Announcement Machine has been allocated.

Following completion of the call chain and the set up of the Connection Table 710, program information, e.g. the connection identifier CIin, is added to the header of each of the data packets. The program information identifies the connection to which a respective packet belongs. Packets are then forwarded to the MSB for processing. The MSB uses both the program information stored in the packet header, and the corresponding call chain information in the MSB, e.g., the HW platform 314, to process the packets.

When a packet arrives on the input link to the MSB, it is placed in an Input Queue 730. The Packet Handler (PH) 700 reads the connection identifier CIin of the packet The PH 700 uses the Connection Table 710 to determine which MSA should be executed for the packet and what priority the processing task has. The packet is then placed in the Processing Input Queue 740 for that priority level.

Figure 8:
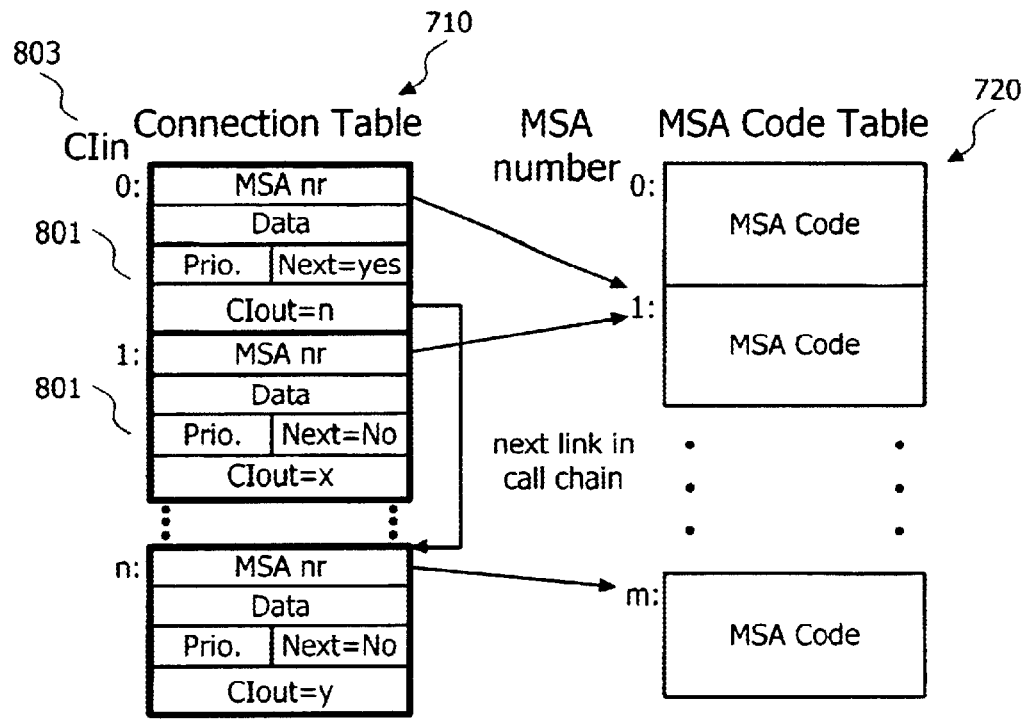
FIG. 8 illustrates an exemplary data structure in an MSB.

Referring to FIG. 8, the Connection Table 710 is comprised of records 801 that are indexed by the packet identifier CIin 803. Each record in the Connection Table 710 includes an application identifier "MSA nr" for the application(s) that is to be used to process the packet data. Each record also includes data information (see FIG. 9) that specifies the locations, if any, from which data is to be read during processing, and to which data is to be written when processing is complete. Also included is the priority "Prio" associated with the application, and a link identifier "Next" indicating whether the next link in the application chain includes an application identifier (Next=Yes) or is an exit point in the chain (Next=No).

In the example shown in FIG. 8, the CIin=0 record in the Connection Table 710 indicates that the MSA code given by MSA nr=1 is to be executed (see pointer to MSA Code Table 720). The CIin=0 record also includes the link identifier NEXT=Yes, indicating that another MSA is to be executed for the call chain. The next link is given by CIout=n. The CIin=n record in the Connection Table 710 indicates that the MSA code given by MSA nr=m is to be executed. The CIin=n record also includes Next=No, indicating that no more MSAs are to be executed for the call chain on this MSB.

Returning to FIG. 7, when a processor (DSP) is ready for a new packet, the DSP reads the Processing Input Queues 740, and the oldest packet with the highest priority is selected. The connection identifier CIin is read from the packet header and the corresponding record in the Connection Table 710 is referenced. The MSA code and data information fields are read from the corresponding connection table record 801. The MSA corresponding to the MSA code is then loaded onto the processor and the packet data is processed. Additional input data may be used to the process the packet if the location of such additional input data is specified in the data information field of the corresponding connection table record 801.

When the MSA execution has completed, the modified packet is sent to the Processing Output Queue 750, along with the newly processed data and CIin. The PH 700 reads the identity of the packet (CIin), and again references the corresponding connection table record 801 writes the data in the Connection Table 710 at the table entry indicated by CIin. If data is to be stored after completion of the MSA task, the storage location will be defined in the data information field of the connection table record 801. The data that may be stored includes the new data and/or the new packet, or nothing, depending on the MSA that was executed, or perhaps an output state of the MSA program. For example, for a Transcoder, new data is stored. For an Announcement Machine, no data needs to be stored. In an EC, the new packet and new data may be stored, depending on the implementation. The PH 700 also checks the corresponding connection table record 801 to determine if more MSAs are to be executed (Next=Yes).

If another MSA is to be executed, the PH 700 reads the next link indicated by CIout in the connection table record 801 and puts the packet in the Processing Input Queue 740, based on the priority level, with the New CI (CIout) added to the packet header. The packet is processed in the same manner as described above. If, however, the link identifier in the corresponding connection table record 801 indicates that no more MSAs are to be executed for the packet (Next=No), the packet is placed in the Output Queue 760 with the New CI (CIout) specifying an exit point for the connection.

Situations may arise when a packet need not be processed by an MSA. In these situations, a special packet handling process may be implemented. For example, for an EC performing echo cancellation in a direction towards the echo generating side, the MSA does not contain any code to execute (referred to as a null function). Instead, the speech packet is simply stored for usage in the connection data in the corresponding opposite direction from the echo generating side. In this situation, the packet can either be sent via the Processing Input Queue 740 and DSP (no code to execute) to the Processing Output Queue 750, or directly to the Processing Output Queue 750 itself. Another option is to execute the filtering, and store the result in the other direction. Details regarding this second option are not further described. It is, of course, possible that both ends of a connection generate echoes, but this situation is handled in the same manner as when echoes are generated only by one end of the connection.

Figure 9:
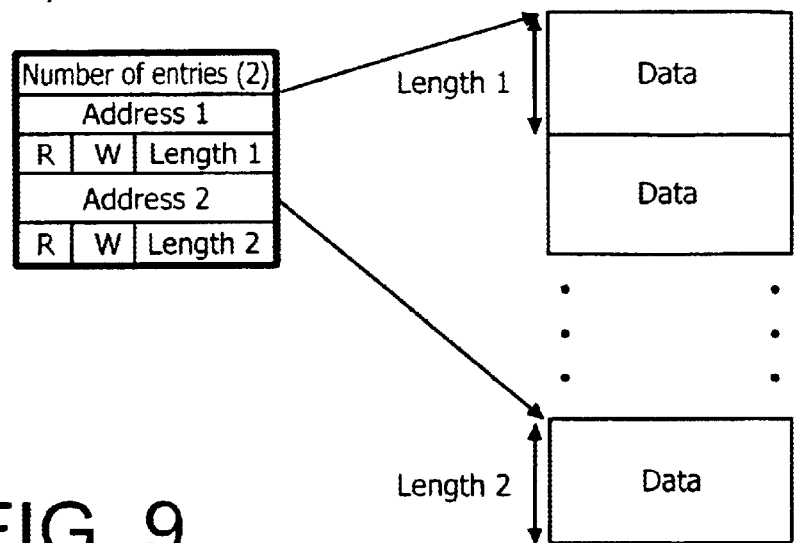
FIG. 9 illustrates an exemplary data entry in a connection table.

FIG. 9 illustrates an exemplary data information entry in a connection table. The data entry indicates how much data is needed for the execution of an MSA and where this data is stored. The number of data entries indicates how many data areas need to be read and/or written. In FIG. 9, two entries are shown.

In FIG. 9, the Address field indicates where in the connection table a Data area starts, and the Length field indicates how long the data field is. R indicates that data should be read from the Data area and used as input data for the execution of the MSA. W indicates that data should be written to the Data area after the execution of the MSA. In most cases only one data area is needed, however, more than one data area is required when performing echo cancellation. For example, a first data area is read by the EC MSA (direction from echo generating side) and used to cancel the echo. The same data area is written by the "EC MSA" in the other direction. This "EC MSA" is a null function in this embodiment as described above. This means that the EC MSAP/"EC MSA" in both directions point need to point at the same data. In one direction data is written, whereas in the other direction the data is read.

It will be appreciated that the MSA code may be preallocated to the processors. If a processor contains the MSA code indicated by the pointer, the processor need not retrieve the MSA code to execute the MSAs.

It will also be appreciated that all MSAs that shall be executed for a packet can be executed in one DSP without having to refer to the PH 700 between execution of the MSAs.

By not requiring code for all MSAs in each processor, the invention minimizes expense, power, and board space. MSA usage can vary short term, e.g., during the day. MSA usage may also vary long term. For example, DTIs might be used more during the day, and EC and Transcoder might be used mostly during the morning and evening. Also, the EC may be used more during the evening, when mobile to PSTN and PSTN to mobile calls are command, and during the day there may be more mobile to mobile calls for which no EC is then used. If there is static allocation of MSAs, e.g., a set number of boards for EC, a set number of boards for Transcoder, and a set number of boards for DTIs, then the node has to be equipped for peak usage of each MSA. This means peak usage for the DTIs, peak usage for ECs, etc. According to exemplary embodiments of the invention, total processing capacity can be used in an efficient way, since processors can be allocated on a per packet basis. Each node does not have to be equipped with processing capacity for peak usage of each specific MSA. It is enough to equip the node with processing capacity for peak allocation of total usage of all MSAs. Thus, less equipment is required, since the sum of peak usage of each MSA is greater than the peak usage of all the MSAs together.

Also, efficiency is improved since the processing is not divided into defined intervals for executing an MSA for a call. For example, when a Transcoding MSA is executed, the execution of silence packets consumes less time compared to packets including speech. In the traditional implementations, this spare processing time cannot be used, but according to exemplary embodiment the processor can immediately start handling another packet when the execution of one packet is finished.

This invention permits efficient use of the processing power, when the needed amount of different MSAs varies over time. This invention also keeps the needed instruction memory and data memory small, since it only needs to hold the data needed for one packet. When new versions of processor boards are introduced, the same method for allocating connections, as described above, can be used. Thus, the invention provides for flexible, adaptable, and efficient allocation of media stream applications.

Although described with reference to a communication system, it will be appreciated by those of ordinary skill in the art that this invention can be embodied in other specific forms without departing from its essential character. For example, the invention may be used in any multi-processor system. The embodiments described above should therefore be considered in all respects to be illustrative and not restrictive.

The various aspects of the invention have been described in connection with a number of exemplary embodiments. To facilitate an understanding of the invention, many aspects of the invention were described in terms of sequences of actions that may be performed by elements of a computer system. For example, it will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

The invention has been described with reference to particular embodiments. However, it will be readily apparent to those skilled in the art that it is possible to embody the invention in specific forms other than those of the preferred embodiments described above. This may be done without departing from the essence of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of processing data in a multi-processor environment, comprising the steps of:
    building an application chain comprising at least one application to be performed on the data;
    receiving the data;
    adding program information to the received data for identifying a current application in the application chain to be performed on the data;
    forwarding the data to an available processor in the multi-processor environment;
    processing the data on the available processor using the current application identified by the added program information; and
    updating the processed data with new program information identifying a next application in the application chain to be performed, if any, wherein the forwarding, processing and updating steps are repeated until the data is processed by all applications in the application chain.

2. The method of claim 1, wherein the data is received in the form of packets, each packet including both a header for storing the added and updated program information, and a payload for storing the received and processed data.

3. The method of claim 1, further comprising the step of forwarding code for the current application from at least one code server operating in the multi-processor environment to the available processor for use in processing the data if the code for the current application is not already installed on the available processor.

4. The method of claim 3, further comprising the step of removing the code for the current application from the available processor after the data has been processed.

5. The method of claim 1, further comprising the step of retrieving additional data needed for performing the application from an address location determined using the program information.

6. The method of claim 1, further comprising the step of storing at least one of the processed data, the program information, and an output state of the available processor at an address location determined using the program information after processing of the data by the current application is completed.

7. The method of claim 1, wherein the step of building an application chain comprises of the steps of forming a link for each of the at least one applications in the application chain, the link having information comprising:
    a processor pool address identifying where in the multi-processor environment the available processor is to be located;
    an application identifier for the application the link represents;
    a first pointer identifying one of a previous link in the application chain and an entry point for the data;
    a second pointer identifying one of a next link in the application and an exit point for the data;
    a priority associated with the application; and
    a link identifier indicating whether a next link in the application chain includes an application identifier.

8. The method of claim 7, wherein the program information added to the received data for identifying a current application in the application chain to be performed on the data is the first pointer included in the link corresponding to the current application in the application chain.

9. The method of claim 7, wherein the processor pool address specifies a plurality of processors located within at least one of a communication network, a network node, a magazine of a network node, a media stream board, and a subset of a plurality of processors located on a media stream board.

10. The method of claim 7, further comprising the step of storing at least some of the link information in a connection table having a record for each link in the application chain, the record being indexed by the corresponding first pointer and including:
    the application identifier for the application the corresponding link represents;
    data information for the corresponding link;
    the priority associated with the application:
    the link identifier Indicating whether the next link in the application chain includes an application identifier; and
    the corresponding second pointer.

11. The method of claim 10, wherein the data Information comprises:
    a data entry field specifying a number of data entries to be used by the current application;
    an address field indicating a starting address for a respective entry;
    a length field indicating a length in memory for a respective entry;
    a read bit indicating whether data should be read from the address of a respective entry and used by the current application when processing the data; and
    a write bit indicating whether data should be written to the address of a respective entry after execution of the current application.

12. The method of claim 1, wherein certain applications are pre-installed on a plurality of processors operating in the multi-processor environment.

13. The method of claim 1, wherein all applications of a respective application chain are executed on a respective processor of the multi-processor environment.

14. The method of claim 1, wherein the multi-processor environment is a communication system.

15. The method of claim 1, wherein the applications are media stream applications.

16. An apparatus for processing data in a multi-processor environment, comprising:

logic that builds an application chain comprising at least one application to be performed on the data;

logic that receives the data;

logic that adds program information to the received data for identifying a current application in the application chain to be performed on the data;

logic that forwards the data to an available processor in the multi-processor environment;

logic that processes the data on the available processor using the current application identified by the added program information; and logic that updates the processed data with new program information identifying a next application in the application chain to be performed, if any, wherein the forwarding, processing and updating steps are repeated until the data is processed by all applications in the application chain.

17. The apparatus of claim 16, wherein the data is received in the form of packets, each packet including both a header for storing the added and updated program information, and a payload for storing the received and processed data.

18. The apparatus of claim 16, further comprising logic that forwards code for the current application from at least one code server operating in the multi-processor environment to the available processor for use in processing the data if the code for the current application is not already installed on the available processor.

19. The apparatus of claim 18, further comprising logic that removes the code for the current application from the available processor after the data has been processed.

20. The apparatus of claim 16, further comprising logic that retrieves additional data needed for performing the application from an address location determined using the program information.

21. The apparatus of claim 16, further comprising logic that stores at least one of the processed data, the program information, and an output state of the available processor at an address location determined using the program information after processing of the data by the current application is completed.

22. The apparatus of claim 16, wherein the logic that builds an application chain comprises logic that forms a link for each of the at least one applications in the application chain, the link having information comprising:

a processor pool address identifying where in the multi-processor environment the available processor is to be located:

an application identifier for the application the link represents;

a first pointer identifying one of a previous link in the application chain and an entry point for the data;

a second pointer identifying one of a next link in the application and an exit point for the data;

a priority associated with the application; and a link identifier indicating whether a next link in the application chain includes an application identifier.

23. The apparatus of claim 22, wherein the program information added to the received data for identifying a current application in the application chain to be performed on the data is the first pointer included in the link corresponding to the current application in the application chain.

24. The apparatus of claim 22, wherein the processor pool address specifies a plurality of processors located within at least one of a communication network, a network node, a magazine of a network node, a media stream board, and a subset of a plurality of processors located on a media stream board.

25. The apparatus of claim 22, further comprising logic that stores at least some of the link information in a connection table having a record for each link in the application chain, the record being indexed by the corresponding first pointer and including:

the application identifier for the application the corresponding link represents;

data information for the corresponding link;

the priority associated with the application;

the link identifier indicating whether the next link in the application chain includes an application identifier; and the corresponding second pointer.

* * * * *